United States Patent

[11] 3,600,607

[72] Inventor Robert Vatin
Ivry, France
[21] Appl. No. 780,655
[22] Filed Dec. 3, 1968
[45] Patented Aug. 17, 1971
[73] Assignee Commissariat A L'Energie Atomique
Paris, France
[32] Priority Dec. 14, 1967
[33] France
[31] 132278

[54] GATE DEVICE TRIGGERED FOR PASSAGES THROUGH ZERO
3 Claims, 6 Drawing Figs.

[52] U.S. Cl. .......... 307/235, 307/290, 330/30, 330/69
[51] Int. Cl. .......... H03k 5/20
[50] Field of Search .......... 307/235, 290, 291; 330/30, 69

[56] References Cited
UNITED STATES PATENTS 3,144,564 8/1964 Sikorra .......... 330/30
3,213,385 10/1965 Sikorra .......... 330/69
3,310,688 3/1967 Ditkofsky .......... 330/30

Primary Examiner—Donald D. Forrer
Assistant Examiner—R. C. Woodbridge
Attorney—Cameron, Kerkam & Sutton ABSTRACT: A gate device has two stable states and a variable threshold voltage utilizing the properties of the differential amplifiers. Two transistors having the same emitter circuit have their collectors connected through a resistor to a point brought at a constant potential. The device is of the type in which the initial input voltage and the input voltage establishing the first stable state are equal and has two transistorized amplifiers, a main amplifier and an additional amplifier and two resistor circuits connecting respectively the first and second stages of the main amplifier to the second and first stages of the additional amplifier. A transistorized amplifier supplies a current proportional to the threshold voltage to the additional amplifier. A direct connection is made between one end of the load resistor of the first stage of the additional amplifier and the input of the second stage of the main amplifier, the voltage drop across said load resistor being equal to the difference between the input voltages for which the first and second stable stages are established.

GATE DEVICE TRIGGERED FOR PASSAGES THROUGH ZERO

The present invention relates to a new type of trigger making use of a Schmitt's trigger device.

It is known that Schmitt's trigger circuit is a differential amplifier receiving the input signal on its first input terminal, provided with an auxiliary coupling circuit between the first stage and the second stage, said auxiliary coupling circuit being connected to the second input terminal of the differential amplifier. Its acts as a nonlinear circuit supplying a voltage that can have two values $Z_1$ and $Z_2$ according to the value of the input voltage $v_e$. The output voltage can be represented as a Boole's variable.

Figure 1:
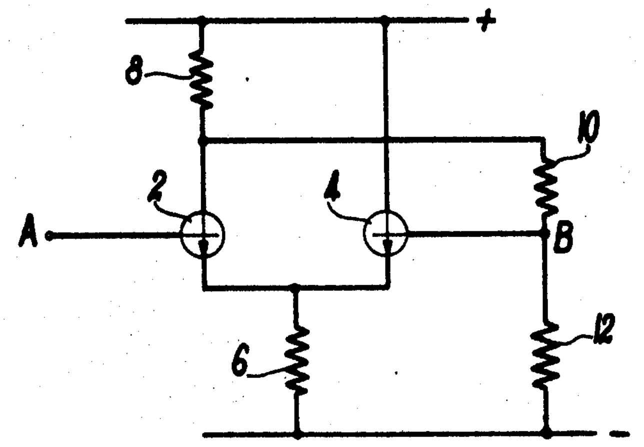
FIG. 1 shows a typical Schmitt trigger circuit.

The FIG. 1 shows a Schmidt's gate of the type considered hereabove, in its simplest form. Said differential amplifier comprises two stages provided with transistors 2, 4 arranged in common emitter circuit (resistor 6). The bases of the transistors are respectively connected to the terminals A and B. Said device comprises a coupling circuit that connects the collector of the transistor 2 to the base of the transistor 4, then to the earth potential. The coupling circuit comprises the resistor 8 that is a part of the collector circuit of the first transistor, the resistor 10 connecting one end of the resistor 8 to the base of the transistor 4 and a resistor 12 connecting the base of the transistor 4 to the negative terminal of the feeding voltage source.

The operation of such a device will be now explained. Under certain conditions, the input voltage, which can have the values $v_1$ and $v_2$, controls the establishment of a first stable state and of a second stable state the output voltage Z having then the values $Z_1$ and $Z_2$, respectively.

The following equations characterize the operation of the device that is a Schmidt's trigger.

$$v_e < V_1 \rightarrow Z = Z_1$$
$$v_e > V_2 \rightarrow Z = Z_2$$

The values of the voltage supplied by the trigger FIG. 1 is an indication of its stable state; if it is equal to $Z_1$, it is the first stable state that is established; if it is equal to $Z_2$, it is the second stable state that is established. For the values of the energizing or input voltage $v_e$ comprised between $v_1$ and $v_2$, the response (output voltage of the apparatus) can be equal to $Z_1$ or $Z_2$ according to the values previously assumed by said energizing voltage. If the energizing voltage increases from $v_1$ to $v_2$, the output voltage of the device is equal to $Z_1$(first stable state), then takes the value $Z_2$ as $v_e$, while increasing, reaches the value of the energizing voltage $v_2$(second stable state). If, on the contrary, the energizing voltage decreases from$v_2$ to $v_1$, the output voltage, which was previously equal to $Z_2$, takes the value $Z_1$ as $v_e$, while decreasing, reaches the energizing voltage $v_1$.

Figure 2:
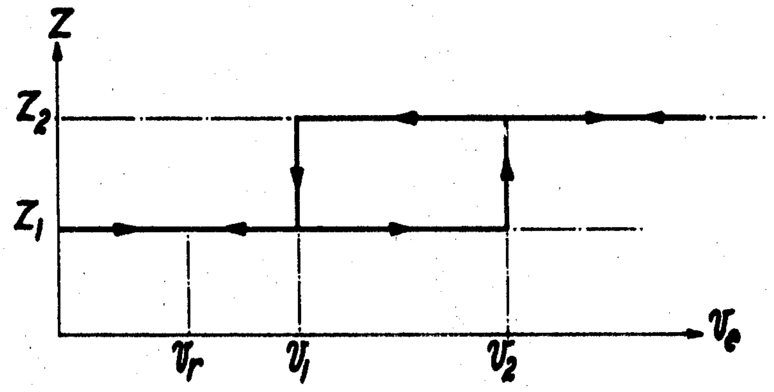
FIG. 2 shows the output of a typical Schmitt trigger.

The diagram of the FIG. 2 shows the variations of the output voltage or response $Z$ of the device of the FIG. 1 with respect to the energizing or input voltage $v_e$.

Figure 3:
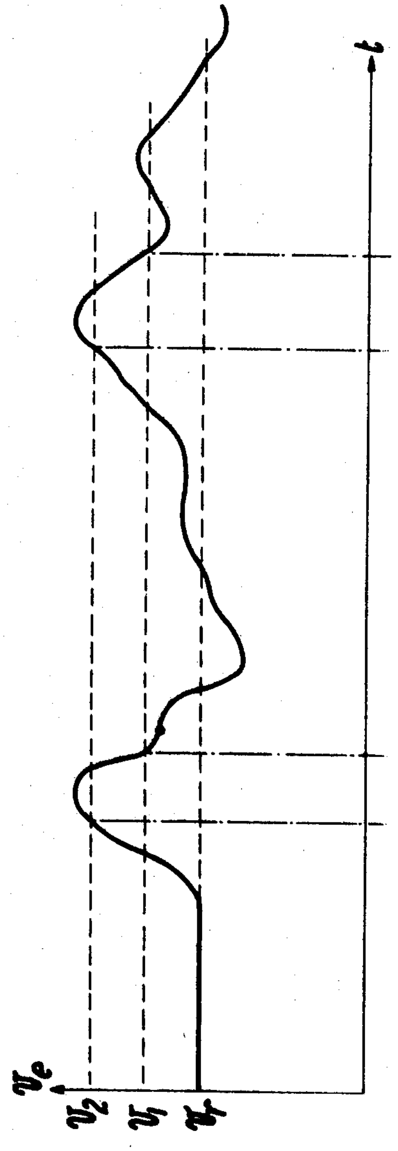
FIG. 3 shows the variation of input voltage with time.
Figure 4:
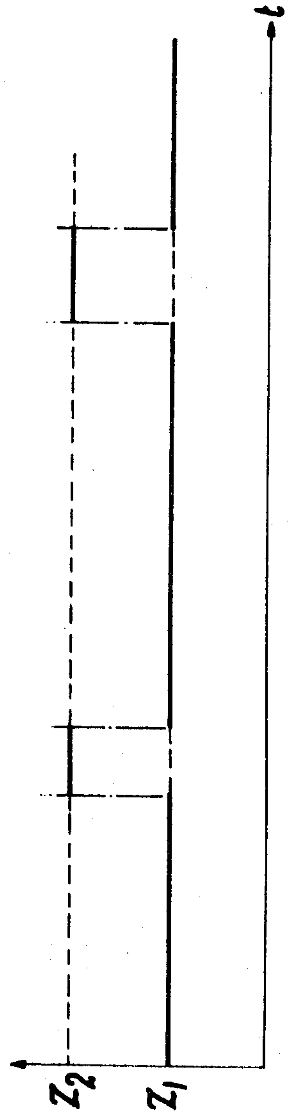
FIG. 4 shows the variation of output voltage with time.

The diagram of the FIGS. 3 and 4 explain the operation of the Schmitt's trigger.

The FIG. 3 shows the variations of the energizing or input voltage in time dependence while the diagram of the FIG. 4 shows the variations of the output voltage in time dependence if the input voltage varies as represented FIG. 3. Said figures show the mode of operation for any variation of the input voltage $v_e$.

In the most general case, the known gate devices have a rest or initial voltage $v_r$ in the absence of input pulse, that is different from the energizing voltage $v_1$ for which the first stable state of the system is established (output voltage $=Z_1$) as $v_e$ decreases from the value $v_2$.

It would be advantageous to have $v_r$ equal to $v_1$ for, in such a case, the time at which an input signal passes through zero could be detected since, as a consequence, the state of the circuit would be changed.

It is often advantageous to change simultaneously the hysteresis voltage or difference between the energizing voltages for which the two stable states are respectively established, and a threshold voltage or difference between the voltage establishing the second stable state and the initial voltage.

The object of the present invention is a gate circuit in which the initial voltage is equal to the energizing voltage that restores the first stable state after the second stable state has been established, that is to say, in which the hysteresis and threshold voltages are equal, whatever may be the variable threshold voltage.

The gate device according to the invention has two stable states; it is characterized in that it comprises two transistorized differential amplifiers: a main amplifier and an additional amplifier, the first and second stages of the main amplifier being respectively coupled to the second and first stages of the additional amplifier through resistor circuits, in that the additional amplifier is fed from a transistorized amplifier supplying a current proportional to the threshold voltage, and in that the input terminal of the second stage of the main amplifier is connected to the load resistor of the first stage of the additional amplifier, the hysteresis voltage —or difference between the voltages for which the second and first stable states are established —being determined by the voltage drop across said load resistor.

The equal values of the hysteresis voltage and of the threshold voltage may be obtained by two different methods: the initial voltage and the voltage establishing the first stable state may be varied simultaneously and identically while the voltage establishing the second stable state is kept at a determined value, or the voltage establishing the second stable state may be varied while the initial voltage and the voltage establishing the first stable state at kept at the same determined value.

According to a first embodiment of the invention, a variable threshold-gate device of the first type considered hereabove, in which the initial voltage and the voltage establishing the first stable state are equal and variable while the voltage establishing the second stable state has a determined value, is characterized in that the transistors of the differential amplifiers are NPN transistors, the collectors of the first and second transistors of the main amplifier being respectively connected to the bases of the second and first transistors of the additional amplifier, in that the collector of the first transistor of the additional amplifier is directly connected to the bases of the second transistor of the main amplifier, in that a potentiometer connected to the base of the first transistor of the main amplifier allows to determine the initial voltage of the system, and in that a two-stage transistorized amplifier — with transistors of opposed types, the first being a PNP transistor —is connected to said potentiometer and feeds the additional amplifier.

According to a second embodiment of the invention, a variable threshold-trigger device of the second type considered hereabove, in which the initial voltage and the voltage establishing the first stable state have the same determined value while the voltage establishing the second stable state is variable, is characterized in that the main amplifier comprises two NPN transistors and is fed from a constant current-generator provided with a transistor of the same type, in that the transistors of the additional amplifier are PNP transistors, in that said amplifier is fed from a variable current-generator provided with a transistor of the same type, the bias potential of the base of the transistor of said variable current-generator being adjusted by means of a potentiometer device, in that the collectors of the first and second transistors of the main amplifier are respectively connected to the bases of the second and first transistors of the additional amplifier through coupling circuits, the collector of the first transistor of the additional amplifier being connected to the base of the second transistor of the main amplifier through a coupling circuit, and in that a second potentiometer device is connected to the base of the first transistor of the main amplifier and allows to adjust the energizing initial voltage above which the first stable state of the system is established in function of the variations of the first potentiometer device.

Figure 5:
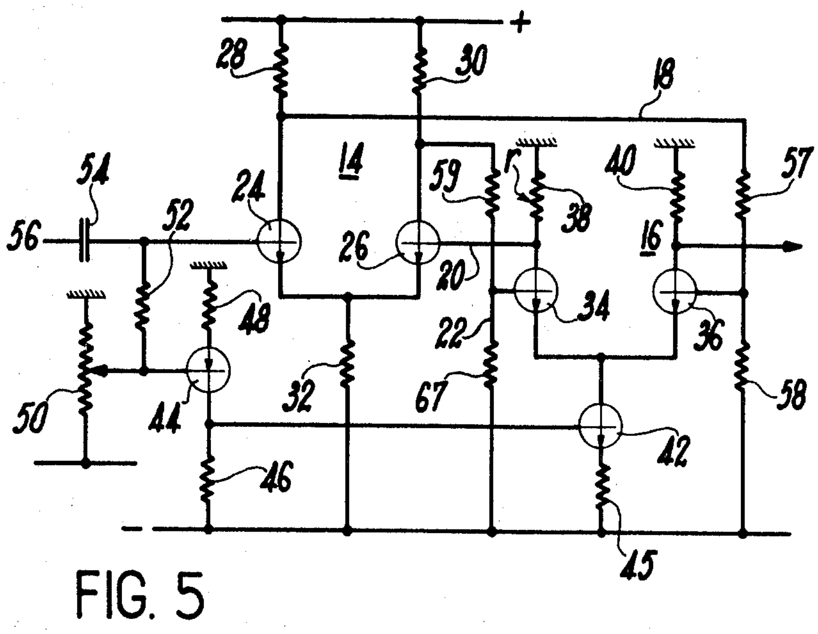
FIG. 5 shows a trigger in which the threshold voltage is adjusted while the voltage establishing the second stable state is kept as a constant valve.
Figure 6:
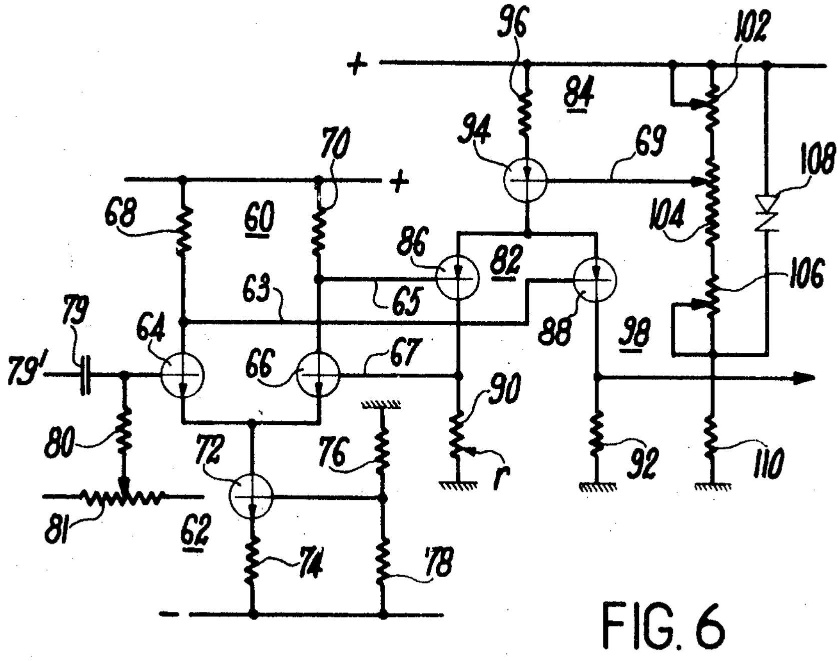
FIG. 6, shows a trigger in which the threshold valve is adjusted without modifying the voltage establishing the first stable state.

The invention will be now described by way of a nonlimitative example and with reference to the accompanying drawings in which:

FIG. 5 shows a trigger in which the threshold voltage is adjusted while the voltage establishing the second stable state is kept at a constant value, FIG. 6 shows a trigger in which the threshold value is adjusted without modifying the voltage establishing the first stable state.

The mode of operation of the Schmitt's trigger FIG. 1 will be first recalled.

If the variations of the input voltages applied to A and B are small with respect to the feeding voltages, the voltage across the resistor 8 is subjected to only small variations and the intensity of the current flowing through the circuit can be considered as an intensity of constant value. If the voltage applied to A is lower than the one applied to B, the current passes through the transistor 4. On the contrary, if the voltage applied to A is higher than the one applied to B, the current passes through the transistor 2; in the latter case, the potential of the common point between the resistor 8 and the collector of the transistor 2 decreases and the voltage drop is transmitted to the base of the transistor 4 with an attenuation $\beta$, through the regenerative circuit (8, 10, 12).

Roughly, the current through the transistor 4 is switched through the other transistor when the voltages applied to A and B are equal.

In the case of amplifier devices with coupling circuits, the gating of the circuit takes place for different values of the two base voltage if the voltage applied to A is decreasing and higher than the voltage applied to B, or if it is increasing while smaller than said voltage. The difference $v_2$—$v_1$ originates in said phenomenon, it is designated as the hysteresis voltage:

$$H=Ir\beta,$$

$r$ being the value of the resistor 8 and $I$, the intensity of the switched current.

In the first method of adjustment described hereabove, it is necessary that the hysteresis voltage $v_2$—$v_1$ keeps continually a value equal to the threshold voltage $v_2$—$v_r$.

It is possible to adjust the threshold voltage of the circuit by varying the initial voltage at the input by means of a potentiometer. As for the hysteresis voltage, it may be adjusted by different methods by modifying one of the three values $I$, $r$, $\beta$ to which it is proportional. Such a result is easily attained by means of a second differential amplifier coupled to the first one, where the feeding current is variable and proportional to the threshold voltage.

FIG. 5 shows such a device; as previously explained, it comprises two differential amplifiers 14 and 16 coupled through three coupling circuits 18, 20, 22; the first amplifier comprises two NPN transistors 24, 26 whose the collectors are connected to the positive terminal of a feeding voltage source through the resistors 28, 30 and whose the emitters are connected to the negative terminal of said source through the common resistor 32.

The second differential amplifier or additional amplifier has exactly the same structure and comprises two NPN transistors 34, 36, two collector resistors 38, 40, the emitters being connected to the negative terminal of the bias voltage source through a series circuit comprising a resistor 45 and a NPN transistor 42 whose the part will be explained later on.

The transistor 42 constitutes the second stage of a current amplifier, supplying a current proportional to the threshold voltage, whose the first stage is constituted by a PNP transistor 44, the collector of the latter being connected to the negative terminal of the feeding voltage source through a resistor 46 while its emitter is connected to the earth potential through a resistor 48. The base of said transistor is connected to the slider of a potentiometer 50 to adjust the initial voltage. Said slider is connected to the base of the transistor 24 through a resistor 52, said base being connected to the input terminal 56 of the apparatus through a capacitor 54.

The coupling circuits connect respectively the collectors of the first and second stages of the main amplifier to the bases of the second and first stages of the differential amplifier; the collector of the transistor 24 is thus connected to the negative terminal through two resistors in series 57, 58 whose the common point is connected to the base of the transistor 36. The collector of the transistor 26 is also connected to said negative terminal through two resistors in series 59, 67 whose the common point is connected to the base of the transistor 34. At last, a third coupling circuit is constituted by a direct connection between the collector of the transistor 34 and the base of the transistor 26.

The four transistors 24, 26, 34, 36 form a regenerative loop, while the transistors 44, 42 form a current generator supplying a current proportional to the threshold voltage to the additional amplifier.

In the initial state the transistors 26, 36 conduct while the transistors 24, 34 are cut off. When the amplitude of the input signal reaches the threshold value, i.e. when said amplitude is higher than $v_2$, the current of 26 is switched through 24 and the current I of 36 is switched through 34. Said currents give rise, across the resistor 38 (value: r), to a hysteresis voltage that must be equal to the threshold voltage. The components associated with the transistor 34 must be determined in consideration of said result to be obtained.

According to the invention, there is provided a second variable threshold-trigger device in which the threshold voltage $v_r$ and the voltage establishing the first equilibrium state $v_1$ are kept constant while the energizing voltage establishing the second stable state is varied. In such conditions, the structure of the circuit is different: two differential amplifiers coupled through three coupling circuits are also used, but, in the first of them, the input voltage is compared with the voltage appearing across a resistor of the second one that is fed from a variable current-amplifier. It will be noted that, in said case, the transistors of the second differential amplifier and of its associated feeding current generator are of the type opposed to the one of the transistors of the first differential amplifier and of its associated feeding current generator.

FIG. 6 shows such a variable threshold-trigger device; it comprises a first unit formed with the current generator 62 and the differential amplifier 60 with the NPN transistors 64 and 66; the collectors of said transistors are connected to the positive terminal of a feeding voltage source through the resistors 68, 70 while their emitter circuit is connected to the collector of the NPN transistor 72 of the generator 62, the emitter of the latter being connected to the negative terminal of a feeding voltage source through a resistor 74. It will be noted that the base of the transistor 72 is connected to a voltage divider connecting said negative terminal to the earth potential and made of the resistors 76, 78.

The input signal is applied to the base of the transistor 64 through a capacitor 79, said base being connected to a resistor 80 and a bias potentiometer 81. Said components are used for determining the voltage $v_1$ establishing the first stable state.

The unit differential amplifier 82—feeding current generator 84 comprises three PNP transistors 86, 88 and 94. The first two transistors from the second differential amplifier, their collectors being connected to the earth potential through the resistors 90, 92 while their emitter is connected to the positive terminal of a second feeding voltage source through the transistor 94 and the resistor 96. The base of the transistor 94 is connected to a voltage divider 98 contributing to the adjustment of the energizing voltage $v_2$ that establishes the second stable state; said divider comprises three potentiometers in series 102, 104, 106 shunted by a Zener diode 108 and connected to the earth potential through a resistor 110. At last, three circuits connect a number of stages of the differential amplifiers; the collectors of the transistors 64, 66 of the first differential amplifier are respectively and directly connected to the bases of the transistors 83, 86; the collector of the transistor 86 is directly connected to the base of the transistor 66 (connection 67).

In said case, the four transistors 64, 66, 86, 88 form also a regenerative loop. The transistor 72 and the resistor 74 form a constant current-generator while the units 94—96 form a variable current-generator according to the position of the slider of the potentiometer 104. In the initial state, the transistors 66 and 86 conduct; the current through the transistor 86 gives rise, across the resistor 90 (value: r) to a voltage that is the threshold voltage of the device. If said voltage is reached by an input pulse, the transistor 66 is cut off while the transistor 64 conducts and, simultaneously, the transistor 86 is cut off while the transistor 90 conducts; the base voltage of the transistor 86 falls to zero. As a consequence, the circuit will be restored in its first stable state only if the input voltage falls to zero.

It is to be understood that the invention is not limited to the details given herein and that it may be modified within the scope of the appended claims.

What we claim is:

1. A trigger device with two stable states established respectively for the values $v_1$ and $v_2$ of its input voltage, $v_2$ being greater than $v_1$ and the threshold voltage, the difference between $v_1$ and the initial voltage at the input $v_r$, being regulatable comprising an assembly of two differential amplifiers, two transistor stages for each of said amplifiers, said transistors having the same emitter circuit, the collectors of said transistors being connected by a resistance to a point brought to a constant potential, said amplifiers providing a principal amplifier and an auxiliary amplifier, the first stage of said principal amplifier being coupled to the second stage of said auxiliary amplifier and the second stage of said principal amplifier being connected to the first stage of said auxiliary amplifier, the input of the second stage of said principal amplifier being connected to the load resistance of the first stage of said auxiliary amplifier, a transistorized amplifier providing said auxiliary amplifier with a current proportional to said threshold voltage whereby a change of stage is obtained when the amplitude of the input signal decreases to zero by equalizing said initial voltage $v_r$ and said value $v_1$ by equalizing said threshold voltage and the difference $v_2-v_1$, hysteresis $v_2-v_1$ being defined by the decrease in voltage in said load resistance.

2. A trigger device as described in claim 1, regulation of the threshold voltage being obtained by regulation of the initial voltage $v_r$, the value $v_1$ being regulatable and the value $v_2$ being fixed, said transistors of said two differential amplifiers being of the NPN type, the collectors of the first and second transistors of said principal amplifier being respectively connected through coupling circuits including a resistance to the bases of the second transistor and of the first transistor of said auxiliary amplifier, the collector of the first transistor of said auxiliary amplifier being directly connected to the base of the second transistor of said principal amplifier, a potentiometer being connected to the base of the first transistor of said principal amplifier to determine the initial voltage of the device and said transistorized amplifier including a first transistor of the PNP type connected to said potentiometer and a second transistor of the NPN type feeding said auxiliary amplifier.

3. A trigger device as described in claim 1, the initial voltage $v_r$ and value $v_1$ being fixed and equal, the value $v_2$ being regulated to control the threshold voltage, said principal amplifier including two NPN transistors fed by a constant current generator including a NPN-type transistor, said auxiliary amplifier including two PNP-type transistors, said transistorized amplifier feeding said auxiliary amplifier and having a PNP-type transistor, the polarizing potential of the base of said last-named transistor being controlled by a potentiometer, the collectors of the first and second transistors of said principal amplifier being respectively connected to the bases of the second and first transistors of said auxiliary amplifier and the collector of the first transistor of said auxiliary amplifier being connected to the base of the second transistor of said principal amplifier.